US008356026B2

(12) United States Patent
Heimendinger

(10) Patent No.: US 8,356,026 B2
(45) Date of Patent: Jan. 15, 2013

(54) PREDICTIVE DATA CACHING

(75) Inventor: Scott M. Heimendinger, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 197 days.

(21) Appl. No.: 12/550,539

(22) Filed: Aug. 31, 2009

(65) Prior Publication Data

US 2011/0055202 A1   Mar. 3, 2011

(51) Int. Cl.
*G06F 17/30* (2006.01)
*G06F 17/00* (2006.01)

(52) U.S. Cl. ............................ 707/713; 707/718; 703/13
(58) Field of Classification Search .................. 707/718, 707/713; 703/13; 711/11; 705/27
See application file for complete search history.

(56) References Cited

U.S. PATENT DOCUMENTS

| 5,305,389 | A | 4/1994 | Palmer |
| 6,014,661 | A * | 1/2000 | Ahlberg et al. ........... 1/1 |
| 7,082,428 | B1 * | 7/2006 | Denny et al. ........... 1/1 |
| 7,168,064 | B2 | 1/2007 | Ousterhout et al. |
| 7,231,496 | B2 | 6/2007 | Curtis |
| 7,548,982 | B2 | 6/2009 | Gu et al. |
| 7,725,526 | B1 * | 5/2010 | Kraft ............................ 709/203 |
| 7,877,380 | B2 * | 1/2011 | Agrawal et al. ............... 707/718 |
| 2005/0055426 | A1 | 3/2005 | Smith et al. |

OTHER PUBLICATIONS

Danchenkov, et al., "Predictive Modeling in Oracle", Sep. 20, 2006, Retrieved at << http://searchoracle.techtarget.com/tip/0,289483,sid41_gci1216960,00.html >>, 4 Pages.
Sarwar, et al., "Usage Pattern Based Prefetching for Mechanical Mass Storage", Retrieved at << http://www.dts-1.com/img2/tec_download/HONET_081118.pdf >>, 4 Pages.
Snopek, et al., "Web Access Predictive Models", International Conference on Computer Systems and Technologies—CompSysTech', 2005, Retrieved at << http://ecet.ecs.ru.acad.bg/cst05/Docs/cp/sV/V.4.pdf >>, 4 Pages.
Brank, et al., "Predictive Algorithms for Browser Support of Habitual User Activities on the Web", Retrieved at << http://research.microsoft.com/en-us/groups/is/wr348_brank_j_2005.pdf >>, 7 Pages.

* cited by examiner

*Primary Examiner* — Yicun Wu
(74) *Attorney, Agent, or Firm* — Turk IP Law, LLC

(57) ABSTRACT

A predictive model is employed to schedule preemptive queries based on frequently utilized query paths in hierarchically structured data. The predictive model determining queries likely to be executed by a user or organization is generated and dynamically modified based on user or organization profiles, usage history, and similar factors. Queries are then executed according to a predefined schedule based on the predictive model and results cached. Cached results are provided to a requesting user more rapidly saving network and computing resources.

19 Claims, 6 Drawing Sheets

220

222

| ROW LABELS | SALES | TAXES |
|---|---|---|
| + AUSTRALIA | $5,000,000 | $159,000 |
| + CANADA | $8,000,000 | $275,000 |
| ☐ USA | $15,000,000 | $352,000 |

224

| ROW LABELS | SALES | TAXES |
|---|---|---|
| + AUSTRALIA | $5,000,000 | $159,000 |
| + CANADA | $8,000,000 | $275,000 |
| ☐ USA | $15,000,000 | $352,000 |
| + ALASKA | $200,000 | $15,000 |
| ☐ CALIFORNIA | $1,000,000 | $99,000 |
| + COLORADO | $500,000 | $22,000 |
| + CONNECTICUT | $150,000 | $19,000 |

226

| ROW LABELS | SALES | TAXES |
|---|---|---|
| + AUSTRALIA | $5,000,000 | $159,000 |
| + CANADA | $8,000,000 | $275,000 |
| ☐ USA | $15,000,000 | $352,000 |
| + ALASKA | $200,000 | $15,000 |
| ☐ CALIFORNIA | $1,000,000 | $99,000 |
| LIVE OAK | $20,000 | $7,000 |
| RIVERSIDE | $560,000 | $49,000 |
| SACRAMENTO | $200,000 | $21,000 |
| SANTA CLARA | $100,000 | $9,000 |
| PALM SPRINGS | $120,000 | $13,000 |
| + COLORADO | $500,000 | $22,000 |
| + CONNECTICUT | $150,000 | $19,000 |

*FIG. 2*

PREDICTIVE DATA CACHING

BACKGROUND

Computers have become an integral part of people's daily lives, professional and personal. Many daily activities from reading newspapers to performing job-related tasks are done through, mostly networked, computers. A majority of those activities include data retrieval from a variety of data sources and processing. Data retrieval is typically performed by generating queries based on a user's request and submitting them to relevant data sources.

In a networked environment, servers managing data sources may receive thousands—if not millions—of queries every day, retrieve the results, and provide them to requesting applications. Hierarchic organization of data is a common occurrence and valuable to users. However, data storage typically does not give preference to paths along the data hierarchy. Thus, new queries are executed for each hierarchical path regardless of their preference, frequency, or importance. This results in inefficient use of network and computing resources.

The experience of reporting data is often hindered by slow query response times, especially in networked environments. A common workaround to this challenge is to produce static reports on scheduled intervals. However, these static reports lack the real-time interactivity that can enable a user to find the interesting nuggets of data or the dynamism to adjust query operations to a user's profile, thereby wasting network and/or computing resources.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to employing a predictive model to schedule "preemptive" queries based on frequently utilized query paths in hierarchically structured data. The predictive model may be formed/adjusted based on user or organization profiles, usage history, and similar factors. Queries may then be executed in a preemptive fashion (prior to an actual request by a user) based on the predictive model and parameterizable thresholds and results cached. Cached results may then be provided to a requesting user more rapidly saving network and computing resources.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIG. 2 illustrates three example report views, where a user may cause queries to be generated by drilling down into details of displayed data;

DETAILED DESCRIPTION

Figure 1:
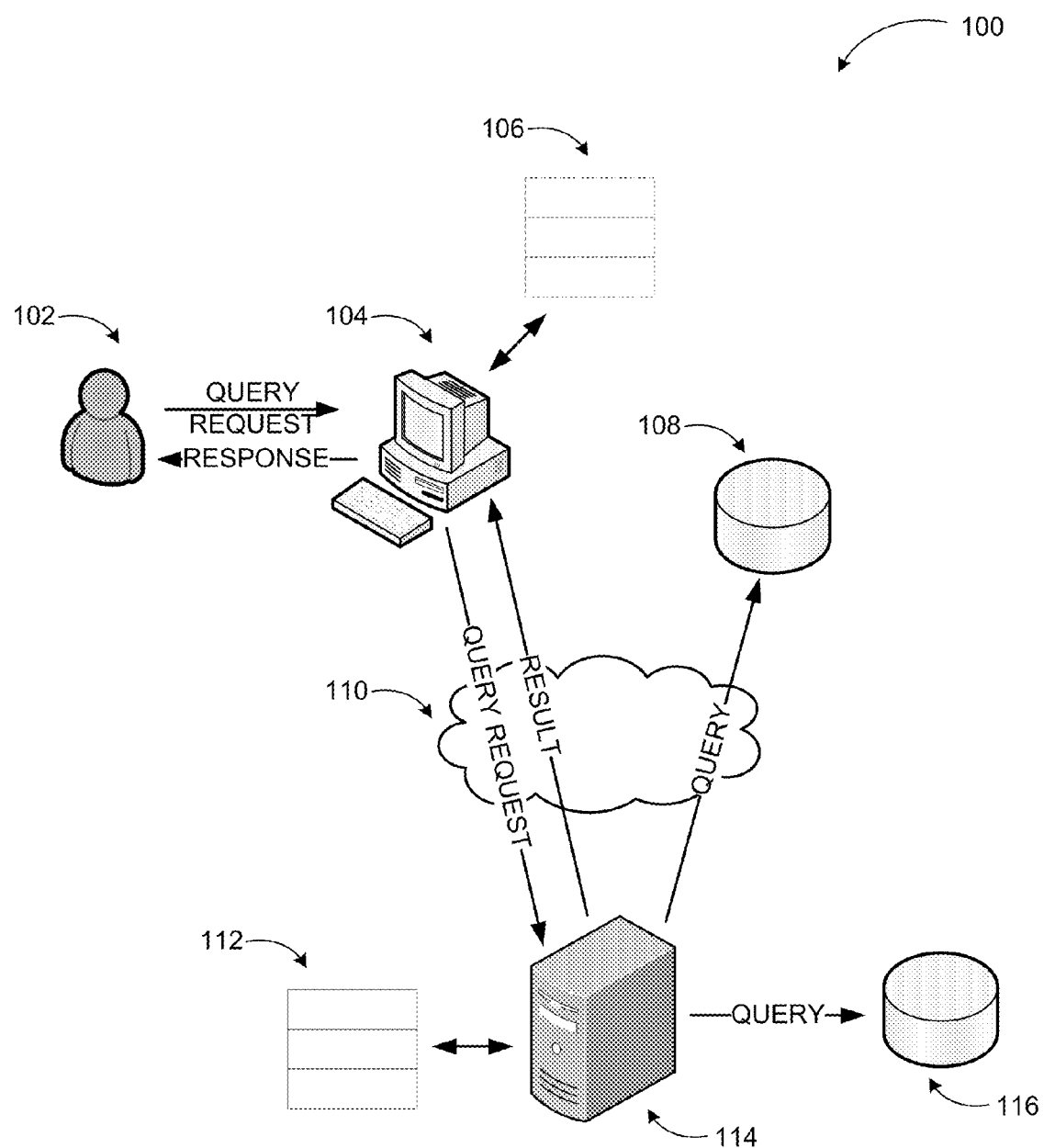
FIG. 1 illustrates interactions in an example networked system, where queries may be executed and results cached according to embodiments.

As briefly described above, query response times and system resource usage may be enhanced by employing predictive data caching. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for providing data processing applications that may employ predictive data caching in executing queries. Examples of platforms include, but are not limited to, a hosted service executed over a plurality of servers, an application executed on a single server, and comparable systems. The term "server" refers to a computing device executing one or more software programs typically in a networked environment. The term "client" refers to a computing device or software application that provides a user access to data and other software applications through a network connection with other clients and/or servers. More detail on these technologies and example operations is provided below.

FIG. 1 illustrates diagram 100 of interactions in an example networked system, where queries may be executed and results cached according to embodiments. In a typical networked system, user 102 may provide a query request through an application executed on client device 104 by requesting a report, an updated spreadsheet, an analysis, and the like. The data may be stored in various data stores such as data stores 108 or 116.

Client device 104 submits the query request to server 114 via network 110. Alternatively, client device 104 may generate the query based on the user's request and submit the query to the server 114 to be executed. Server 114 executes the query retrieving data directly from data store 116 or remotely through network 110 from data store 108. Of course other servers, data stores, and network components such as firewalls may be involved in the communications.

As discussed above, many applications utilize hierarchically structured data in performing analyses, generating graphic displays, and performing other tasks. User requests typically involve one or more paths through the hierarchic data structure and not all of the available data is queried. Thus, the query operation is limited compared to available data. However, delays due to network communications, server availability, data store availability, and the like may prevent the results from being provided to the requesting user promptly.

In a system according to embodiments, the challenge of improving query response time is addressed by combining the cached nature of scheduled reports with the interactivity of real-time reporting tools. A dynamically adjustable predictive model is built based on input parameters like user profile, organizational profile, peer usage, query history, and comparable ones. Thus, by keeping a history of which queries were executed over time and by whom, a prediction can be made what query a user is likely to execute and how frequently. Using this information, likely queries may be executed and results cached before the user asks for the query, thus making queries appear to be more responsive. The results may be cached at the server (cache memory 112), at the client device 104 (cache memory 106), or even at a designated data store.

FIG. 2 illustrates three example report views, where a user may cause queries to be generated by drilling down into details of displayed data. A common usage of data is in generating various reports. For example, sales reports, performance reports, forecast reports, and comparable ones are used by many professions and are based on changing data from a number of sources. In many cases, the data for such reports are in a hierarchical structure. Such structures may be organizational, geographic, chronological, or otherwise.

The example report views 220 in FIG. 2 are based on sales and tax information for a business based on countries, states, and cities. Thus, the data included in the report is collapsible. At a default view 222, the report may present data at the top (country) level. Upon selection of a country by the user, a second report view 224 may be presented with additional details such as states under the selected country. Upon further selection of a state in the second report view 224, a third report view 226 showing yet more details (cities under the selected state) may be presented.

Thus, one way of providing the report to a user is executing a query that retrieves all relevant data (all cities, all states, and all countries). This would however waste computing and network resources (processing time, memory, network usage, etc.) unnecessarily, since the user is likely to be interested in one particular set of details (e.g. one or more cities in a given country) anyway.

Another approach is to wait until the user specifies the path they are interested in (country-state-city), and execute a path-specific query at that time. Depending on system conditions (network load, server availability, data source responsiveness, etc.), this approach may result in slow response degrading user experience.

In a system according to embodiments, path-specific queries likely to be requested by a user are determined employing a predictive model as discussed herein. These queries may then be executed based on a schedule determined by the predictive model without waiting for the user's request and cached at a server, at a designated data source, or even at the user's client device. When the user requests data, a determination may be made first as to whether the requested data is already cached or not. If the request (as predicted) is associated with an already cached set of results, the result can be provided to the user rapidly reducing query response time and enhancing user experience.

In the example report views of FIG. 2, the user may be a sales person located in California and frequently request sales data for California as opposed to sales data for Australia. Upon determining the user's profile, the system may cache results of a query for sales data in California at a frequency based on user's request frequency. When the user actually requests the data, the latest cached results may be provided directly instead of waiting for the query to be executed and results returned.

Figure 3:
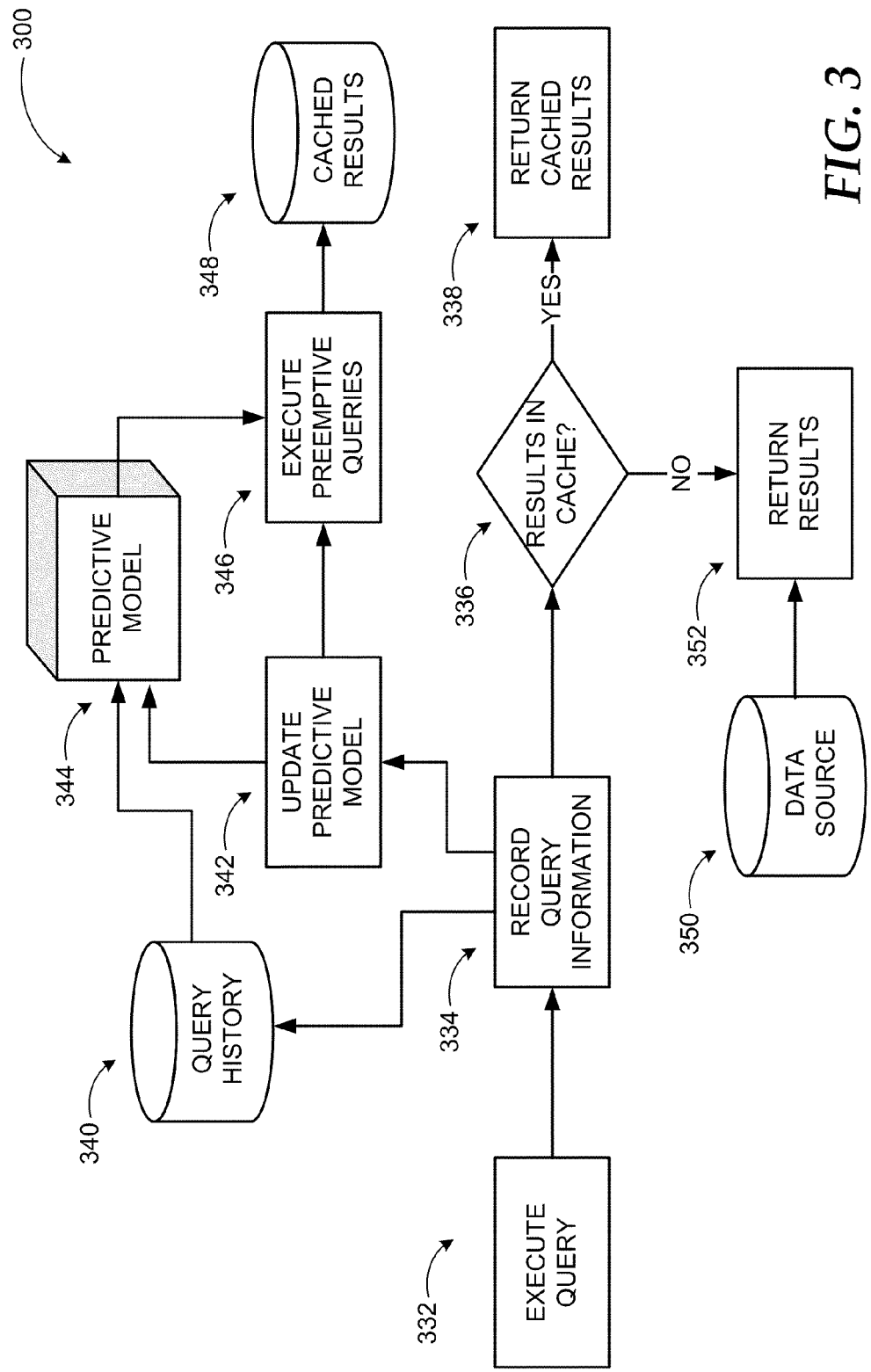
FIG. 3 illustrates major components and operations in a predictive data caching system according to embodiments.

FIG. 3 illustrates major components and operations in a predictive data caching system in diagram 300. A system according to embodiments performs four main operations: (1) storing query information for use in building or refining a predictive model; (2) using the predictive model to preemptively query the data source; (3) caching the results of preemptive queries; and (4) returning cached results that match a user-executed query.

Upon execution of a query (332), query information may be recorded (334) first. In storing the query information, a data source (350) is defined. The data source may be any collection of data that is persisted over time and supports a mechanism of returning results based on a query. Examples of data sources include databases, data cubes, tables, and similar ones. The recorded information may include, but is not limited to, the defined data source(s), the measures in the requested query (e.g. price, amount, percentage, etc.), the dimensions in the requested query (e.g. by organization, by customer, by geography, by chronological division, etc.), aggregation method(s) requested in the query (e.g. average, min, max, sum, count, etc.), grouping requested in the query (e.g. "Group by Customer ID"), sorting requested in the query (e.g. "Sort descending by Date"), requesting user's identity, requesting user's affiliations, date and time of the query request, time it takes to execute the requested query, and the like.

The query information may be stored in a data structure 340 for each data source. The data structures may be relational databases, data cubes, flat files, structured documents (e.g. an extensible markup language 'XML' document), or any other schematized format. The system uses the stored query information to build a predictive model 344. The predictive model 344 may be used to answer questions like "given X, what is the most likely query to be executed against this data source next", where X can be a combination of recent queries, the identity of a user who is currently querying the data source, or environmental variables like the day of the month, time of day, etc.

The model may employ one or more algorithms for creating predictions. The algorithms may include neural networks, Bayesian trees, collaborative filtering, and other techniques often found in data mining applications such as various machine learning algorithms (e.g. weighted majority algorithm). The user or an administrator may be enabled to configure which algorithm is employed and the relative weights of the input variables in order to optimize the predictive accuracy of the model. Further parameterization may include definition of a threshold for the confidence level provided by the predictive model (e.g. queries with confidence levels above a predefined threshold are to be executed as 'preemptive' queries). According to some embodiments, data mining techniques may be employed to build the model such that it can self-tune its algorithm(s) and employ variable weighting over time to produce more accurate predictions.

When a query is executed against data source 350, the system feeds the information about that query (similar to the information captured above) into the predictive model 344 as input variables, which may also be used to update the predictive model (342). The model returns a set of queries likely to follow from the most recent query, along with the statistical probabilities for each suggestion. Based on a configurable parameter, specified by a user or specified as the result of the predictive model 344 self-optimizing, suggested queries with a statistical likelihood over a predefined threshold or with a historical query response time below another predefined threshold, may be chosen for execution (346) and caching.

The system executes and stores the results of the preemptive queries suggested by the predictive model. The results may be stored in a data structure (348) that is optimized for retrieval speed, as opposed to small storage size. This data structure 348 (or cache) may hold a configurable number of query results, and the results within the cache may expire based on a user preference, or information about the frequency with which the query data source is updated. The system may choose to update the preemptive query results in the cache when an event is triggered (e.g. a new query is executed against the data source, changes in the data source) or on a schedule.

When a new query is executed against the data source 350, the system first looks in the cache to determine if the results of that query already exist (336). If so, the results are returned (338) from the data in the cache, as opposed to the data in the data source 350. If no results are cached for the requested query, a new query is executed and results returned (352) from data source 350.

While the example systems in FIG. 1 and FIG. 3 have been described with specific elements and interactions, embodiments are not limited to these configurations and can be implemented with other components and configurations. Furthermore, embodiments are not limited to hierarchically structured data. Any form of data may be queried employing a predictive data caching model using the principles described herein.

Figure 4:
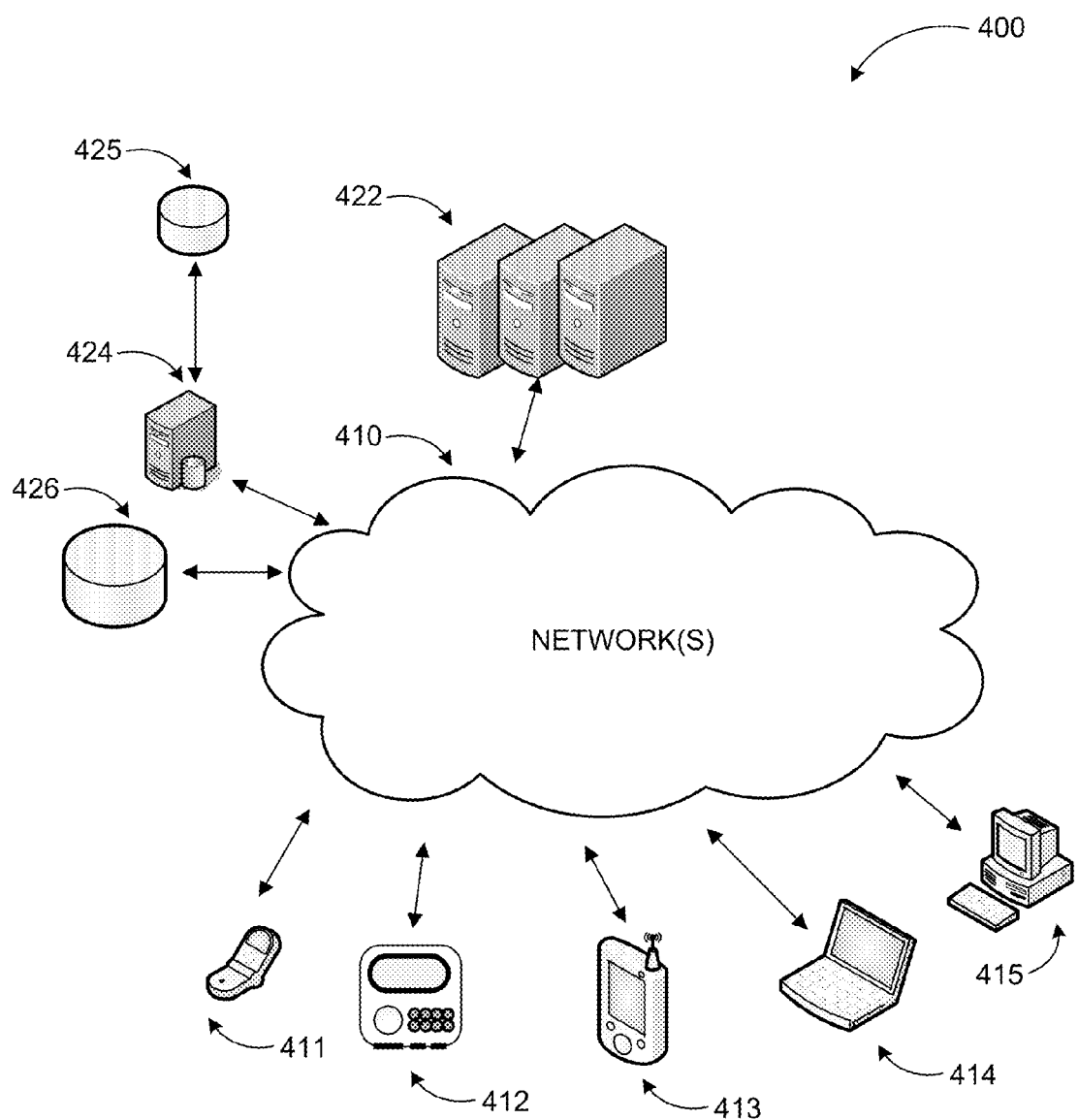
FIG. 4 is a networked environment, where a system according to embodiments may be implemented.

FIG. 4 includes diagram 400 of an example networked environment, where embodiments may be implemented. A platform providing predictive data caching with above discussed features may be implemented via software executed over one or more servers 422 such as a hosted service. The platform may communicate with consuming applications on individual computing devices such as a cellular phone 411, smart automobile console 412, a handheld computer 413, a laptop computer 414, and desktop computer 415 ('client devices') through network(s) 410.

Client devices 411-415 are capable of communicating through a variety of modes between subscribers of a communication service. Users may execute any application on one of the client devices 411-415, which may require retrieval of data from one or more data sources. The platform providing data processing services with predictive data caching may schedule frequently used queries based on factors discussed previously and provide results of the queries faster to the consuming application. Data may be retrieved from individual data sources such as data store 426 directly by the platform or data sources managed by a database server such as data store 425 managed by database server 424.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also comprise a plurality of distinct networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a data processing system employing predictive data caching. Furthermore, the networked environments discussed in FIG. 4 are for illustration purposes only. Embodiments are not limited to the example applications, modules, or processes.

Figure 5:
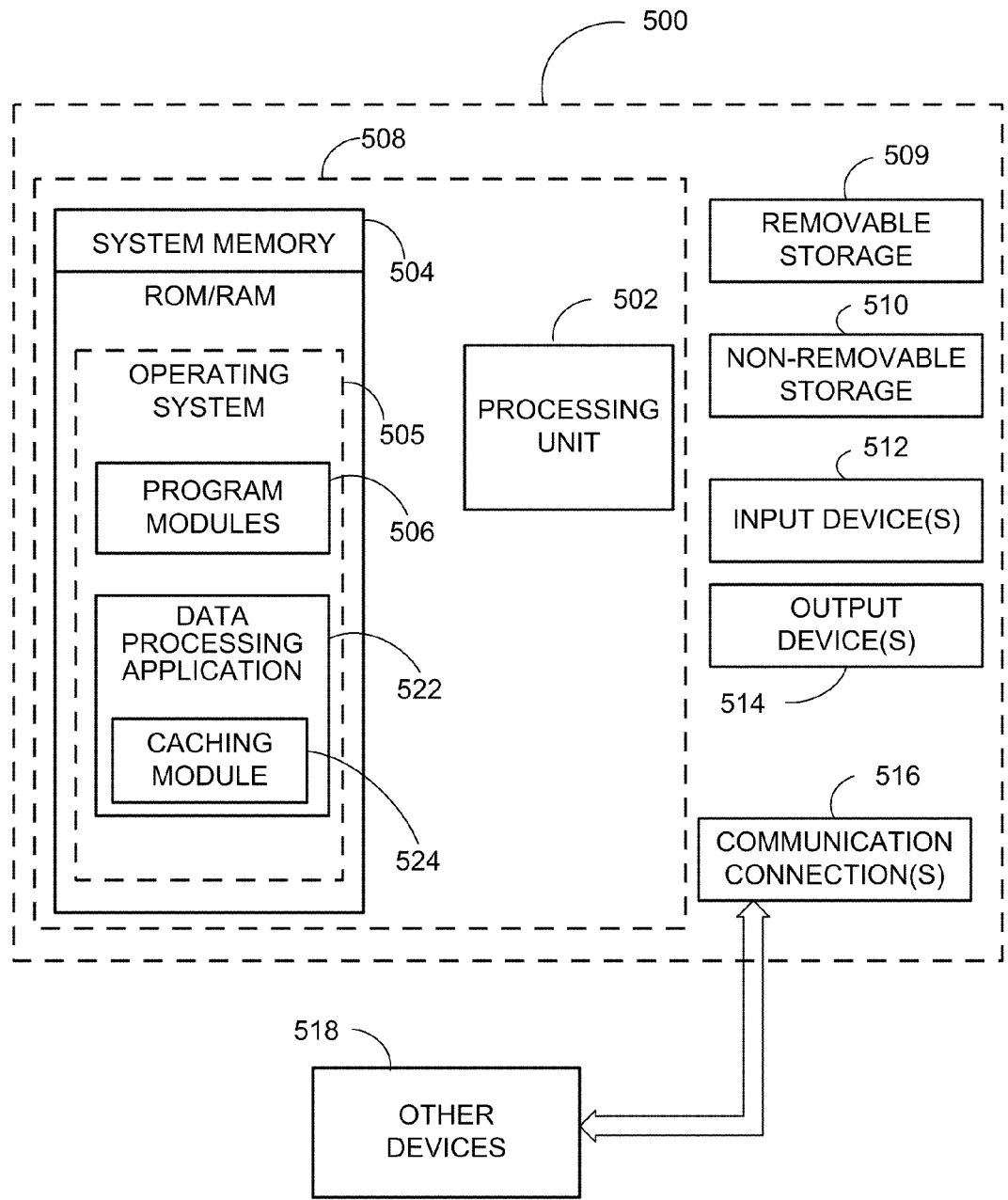
FIG. 5 is a block diagram of an example computing operating environment, where predictive data caching according to embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computer 500. In a basic configuration, computer 500 may be a server executing a stat processing service with predictive data caching or a client device performing the same, and include at least one processing unit 502 and system memory 504. Computer 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, data processing application 522, and caching module 524.

Data processing application 522 and caching module 524 may be separate applications or integral modules of a hosted service that provides computing services to client applications/devices. Data processing application 522 may provide data retrieval, organization, analysis, and similar functions including reporting retrieved data to clients. Caching module 524 may, among other things, maintain a predictive model to schedule preemptive query execution as discussed in more detail above. This basic configuration is illustrated in FIG. 5 by those components within dashed line 508.

Computer 500 may have additional features or functionality. For example, the computer 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computer 500. Any such computer readable storage media may be part of computer 500. Computer 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computer 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, provide data for data processing application 522, and so on. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
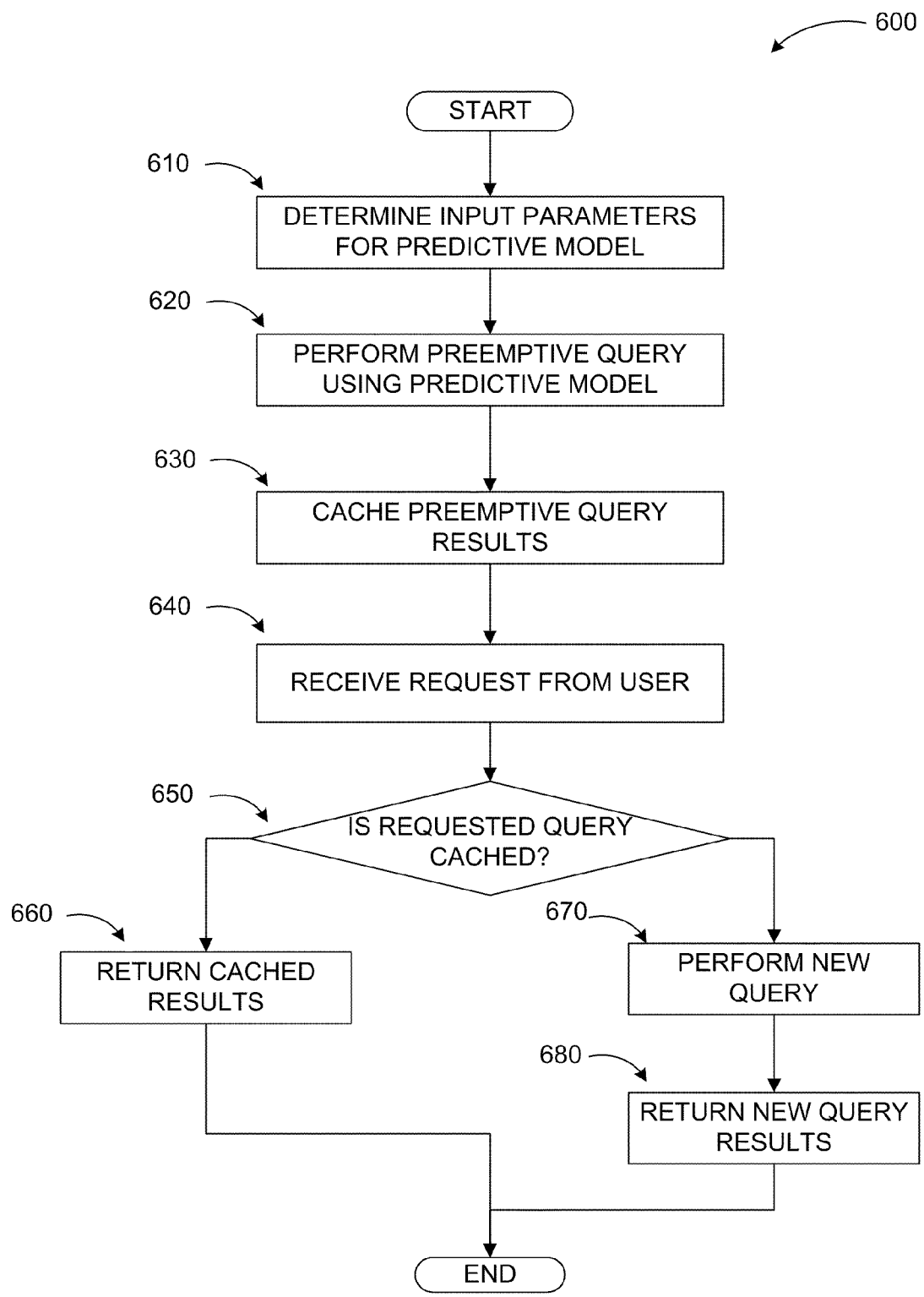
FIG. 6 illustrates a logic flow diagram for a process of predictive data caching according to embodiments.

FIG. 6 illustrates a logic flow diagram for process 600 of employing predictive data caching in executing queries. Process 600 may be implemented by any data processing application executing queries and reporting results such as the ones described above.

Process 600 begins with operation 610, where input parameters for the predictive model are determined. The predictive model may be generated or adjusted based on a user profile, organization profile, profiles or peers of the user, usage history, and/or similar parameters. Furthermore, scheduling of preemptive queries may also be parameterized based on one or more predefined thresholds associated with the confidence level provided by the predictive model.

At operation 620, a preemptive query is executed based on the scheduling provided by the predictive model. The results of the query are cached at operation 630 without having received a request from the user to perform the query.

At operation 640, a request is received from the user to execute a query. This is followed by decision operation 650, where a determination is made whether the results of the requested query have already been cached based on scheduling by the predictive model. If the results are cached, they are returned to the requesting user at operation 660. If the results are not cached, a new query is executed at operation 670 and its results returned to the requesting user at operation 680.

The operations included in process 600 are for illustration purposes. Employing predictive data caching in executing queries may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for retrieving data employing a predictive data caching model, the method comprising:
    building a dynamically adjustable predictive model for keeping a history of frequently utilized queries and predicting a path-specific query and a likelihood and frequency of queries to be executed;
    determining a preemptive path-specific query through the predictive model based on the likelihood of queries to be executed;
    maintaining the predictive model at a caching module for executing the at least one preemptive schedule according to a schedule determined by the predictive model;
    scheduling the preemptive query through the predictive model based on the frequency of the queries to be executed according to the schedule maintained at the caching module;
    executing the preemptive query by retrieving data for the preemptive query from one or more local and remote data stores utilizing a data processing application configured for retrieving, organizing, and reporting the data;
    caching results of the preemptive query at one or more of the server, a client device, and a designated data store;
    receiving a query request and recording information associated with the requested query for user in building and refining the predictive model; and
    if the requested query matches the preemptive query, retrieving the data from the cache and returning the cached results that match the query request; else
    executing the requested query by retrieving data for the query from the one or more local and remote data stores utilizing the data processing application.

2. The method of claim 1, wherein input parameters of the predictive model are employed to perform one of:
    generating the predictive model; and
    dynamically adjusting the predictive model.

3. The method of claim 2, wherein the input parameters include at least one from a set of: a user profile, an organizational profile, a peer usage, and a query history.

4. The method of claim 1, further comprising:
storing preemptive query information along with the cached results.

5. The method of claim 4, wherein the preemptive query information includes at least one from a set of:
a data source identification, a measure of the query, a dimension of the query, an aggregation method of the query, a grouping of the query, a sorting of the query, a user identification, a user affiliation, a date and time of query request, and a time spent executing the query.

6. The method of claim 4, wherein the query information is stored in a data structure optimized for speedy retrieval.

7. The method of claim 1, wherein the predictive model employs at least one prediction algorithm from a set of: neural networks, Bayesian trees, collaborative filtering, data mining algorithms, and machine learning algorithms.

8. The method of claim 7, further comprising:
enabling a user to modify at least one of: an algorithm employed for the predictive model and relative weights of the input parameters in order to optimize an accuracy of the predictive model.

9. The method of claim 1, further comprising:
scheduling the preemptive query based on a predefined threshold for a confidence level provided by the predictive model and another predefined threshold for historical query response time.

10. The method of claim 9, wherein the predefined threshold for the confidence level provided by the predictive model and the other predefined threshold for the historical query response time are adjustable by at least one of: a user and an administrator.

11. The method of claim 1, further comprising:
executing a configurable number of preemptive queries based on the predictive model; and
caching results for the executed preemptive queries.

12. A system for executing queries on behalf of users, the system comprising:
at least one data store;
a server comprising:
a memory device;
a processor coupled to the memory device, the processor configured to:
upon execution of a query request, record query information associated with the query request in a defined data source that includes a collection of data persisted over time and supports a mechanism of returning results based on a query;
determine input parameters for a predictive model based on a combination of recent queries, a profile of the user, and environmental variables;
build the predictive model for keeping a history of frequently utilized queries and predict a path-specific query and a likelihood and frequency of queries to be executed;
determine a preemptive path-specific query based on the input parameters for the predictive model;
maintain the predictive model at a caching module for executing the at least one preemptive schedule according to a schedule;
schedule the preemptive query through the predictive model based on the frequency of the queries to be executed according to the schedule maintained at the caching module;
execute the preemptive query on the at least one data store by retrieving data for the preemptive query from one or more local and remote data stores utilizing a data processing application for retrieving, organizing, and reporting the data;
cache results of the preemptive query at one or more of the server, a client device, and a designated data store;
receive the request from the client device;
generate a query based on the received request;
determine if the generated query is associated with the preemptive query; and
if the generated query matches the preemptive query, retrieve the data from the cache and return the cached results instead of executing the requested query; else
execute the requested query by retrieving data for the query from the one or more local and remote data stores utilizing the data processing application.

13. The system of claim 12, wherein the query is generated at the client device based on the request received from a user and the generated query forwarded to the server for execution.

14. The system of claim 12, wherein the predictive model employs at least one data mining algorithm for self-tuning its prediction algorithms and variable weighting over time to produce more accurate predictions.

15. The system of claim 12, wherein the cached results of the preemptive query are configured to expire based on one of: a user preference and a frequency of updates to the at least one data store.

16. The system of claim 12, wherein the at least one data store includes one of: a database, a data cube, a flat file, a structured document, and a schematized data file.

17. A computer-readable storage medium having instructions stored thereon for providing data retrieval employing a predictive data caching model, the instructions comprising:
determining input parameters for the predictive model based on at least one from a set of: a combination of recent queries, a profile of a user, an organizational profile, a peer usage, and environmental variables, wherein the input parameters are employed to generate and dynamically adjust the predictive model for keeping a history of frequently utilized queries and predicting a path-specific query and a likelihood and frequency of queries to be executed;
determining at least one preemptive path-specific query through the predictive model based on the likelihood of queries to be executed;
maintaining the predictive model at a caching module for executing the at least one preemptive schedule according to a schedule determined by the predictive model;
scheduling the at least one preemptive query based on a predefined threshold for a confidence level provided by the predictive model and another predefined threshold for historical query response time according to the schedule maintained at the caching module;
executing the at least one preemptive query by retrieving data for the preemptive query from one or more local and remote data sources utilizing a data processing application for retrieving, organizing, and reporting the data;
caching results of the preemptive query at one or more of a server, a client device, and a designated data store;
receiving a query request and recording information associated with the requested query for user in building and refining the predictive model;
determining if the requested query matches the preemptive query;
if the requested query matches the preemptive query, retrieving the data from the cache and returning the cached results; else executing the requested query by retrieving data for the query from one or more local and remote data sources utilizing the data processing application; and updating the preemptive query results in the cache based on a trigger event.

18. The computer-readable storage medium of claim 17, wherein the trigger event includes at least one from a set of: execution of a new query on a data source identified by the preemptive query, a change at the data source, and a predefined schedule.

19. The computer-readable storage medium of claim 17, wherein the instructions further comprise:

enabling the user to modify at least one from a set of: an algorithm employed for the predictive model, relative weights of the input parameters, the predefined threshold for the confidence level provided by the predictive model, and the other predefined threshold for the historical query response time.

* * * * *